A. J. CRAIG.
Harrow.

No. 82,923.

Patented Oct. 13, 1868.

Witnesses:

Inventor:
Andrew J. Craig
by Alexander Mahen
Attys.

United States Patent Office.

ANDREW J. CRAIG, OF ASHMORE STATION, ILLINOIS.

Letters Patent No. 82,923, dated October 13, 1868.

IMPROVEMENT IN HARROWS.

The Schedule referred to in these Letters Patent and making part of the same

*To all whom it may concern:*

Be it known that I, ANDREW J. CRAIG, of Ashmore Station, in the county of Coles and in the State of Illinois, have invented certain new and useful Improvements in Harrows; and do hereby declare that the following is a full, clear, and exact description thereof, reference being had to the accompanying drawings and to the letters of reference marked thereon.

The nature of my invention consists in a series of hooks or teeth, which are bent over forward, and fastened together at the point where they are bent, by means of rivets, bolts, screws, or in any other suitable manner, and forming two sides of a triangle, cross-bars being placed at convenient distance from each other, and attached to the teeth in the same manner that the teeth are fastened together, on which cross-bars the handles are fastened.

In order to enable others skilled in the art to make and use my invention, I will now proceed to describe its construction and operation, referring to the annexed drawings which form a part of this specification, and in which—

Figure 1:
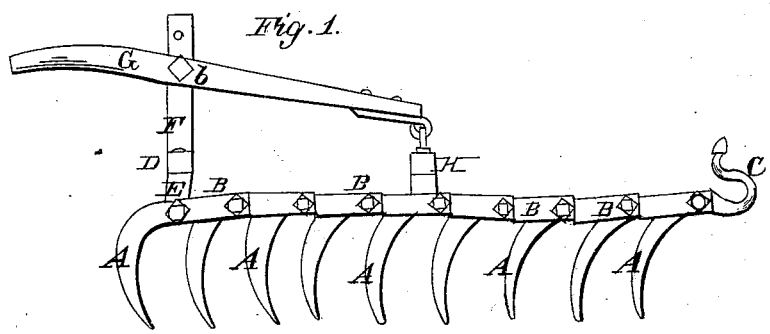

Figure 1 is a side view, and

Figure 2:
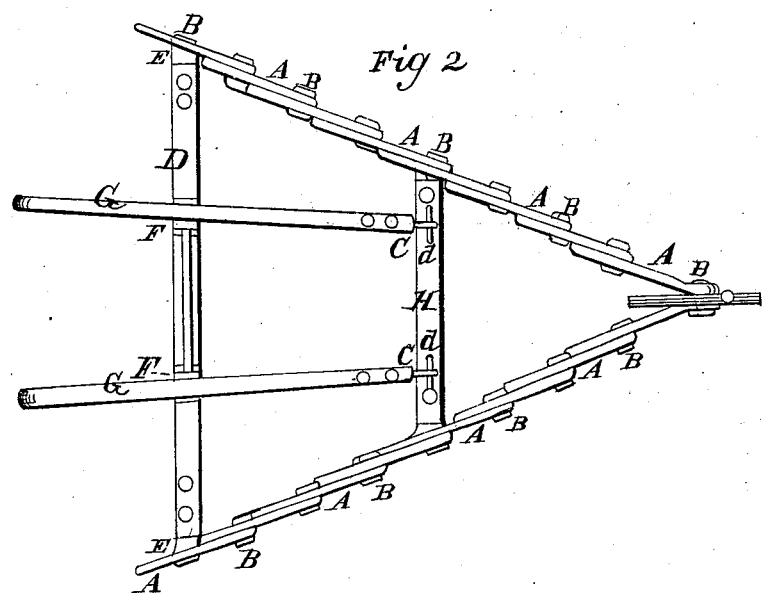

Figure 2, a plan view.

A A represent the teeth, which may be made of any suitable material, either flat, square, or shaped in any manner to suit the different kinds of ground, and either straight or slightly turned out at the points, the upper part of the teeth being bent over forward, as shown in fig. 1.

These teeth are fastened together by rivets B B, in such a manner that the rivet passes through the front end of one tooth, and through the point of the next, where the same is bent forward, thus forming a complete chain of teeth, of such length as may be required.

Two of these chains are made, which are fastened together at the front by a rivet through one middle tooth, as shown in fig. 2. This middle tooth is bent forward and then upward, forming a hook, C, to which the team is attached in the most convenient manner.

The chains of teeth thus fastened together spread outward toward the rear, forming two sides of a triangle, and over the last tooth on each chain is a cross-bar, D, attached.

This cross-bar is fastened at each end to an angular bar, E, which is bent downward, and riveted to the rear tooth at the same point and in the same manner as the teeth themselves are fastened to each other.

The cross-bar D is provided with two standards, F F, which are connected at top by a rod, $a$, and support on their outer side the handles G G, these being pivoted thereon by rivets or bolts, $b\ b$, and extending forward to another cross-bar, H, which is placed at a suitable distance from the first cross-bar, and fastened to the teeth in like manner.

The handles are attached to the cross-bar by means of metal hooks, $c\ c$, running through holes in the metal staples, $d\ d$, on the bar.

Having thus fully described my invention,

What I claim as new, and desire to secure by Letters Patent, is—

The bent teeth A A, pivoted together as described, so as to form a harrow with flexible sides, substantially as and for the purposes herein set forth.

In testimony that I claim the foregoing, I have hereunto set my hand this 14th day of May, 1868.

ANDREW J. CRAIG.

Witnesses:
ISAAC N. VAN DYKE,
H. L. BIRDWELL.